(12) United States Patent
Miller et al.

(10) Patent No.: US 8,739,872 B1
(45) Date of Patent: Jun. 3, 2014

(54) LOST CIRCULATION COMPOSITION FOR FRACTURE SEALING

(71) Applicant: Halliburton Energy Services, Inc., Houston, TX (US)

(72) Inventors: Matthew L. Miller, Spring, TX (US); Donald L. Whitfill, Kingwood, TX (US); Jason T. Scorsone, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/782,799

(22) Filed: Mar. 1, 2013

(51) Int. Cl.
| | |
|---|---|
| C09K 8/60 | (2006.01) |
| C09K 8/20 | (2006.01) |
| C09K 8/035 | (2006.01) |
| E21B 43/267 | (2006.01) |
| E21B 33/13 | (2006.01) |
| E21B 33/00 | (2006.01) |
| C09K 8/487 | (2006.01) |
| C09K 8/42 | (2006.01) |

(52) U.S. Cl.
CPC .............. *C09K 8/487* (2013.01); *C09K 8/426* (2013.01); *C09K 2208/04* (2013.01); *C09K 2208/08* (2013.01)
USPC ........ 166/280.2; 166/292; 166/285; 166/293; 166/294; 507/204; 507/104

(58) Field of Classification Search
CPC .............. C04B 28/02; C04B 2103/46; C04B 2111/00146; C04B 35/80; C04B 14/365; C04B 18/24; C09K 8/467; C09K 8/46; C09K 8/40; C09K 8/487; C09K 8/5045; C09K 2208/04; C09K 2208/08; E21B 33/13
USPC ........... 166/280.1, 280.2, 205, 281, 285, 292, 166/308.1, 271, 293, 294; 106/690, 692; 507/204, 104
See application file for complete search history.

(56) References Cited

U.S. PATENT DOCUMENTS

| | | | |
|---|---|---|---|
| 4,102,400 A | | 7/1978 | Crinkelmeyer et al. |
| 6,861,392 B2 | | 3/2005 | Shaarpour |
| 6,902,002 B1 | | 6/2005 | Chatterji et al. |
| 6,976,537 B1 | * | 12/2005 | Verret ............................ 166/294 |
| 7,055,603 B2 | | 6/2006 | Caveny et al. |
| 7,066,285 B2 | | 6/2006 | Shaarpour |
| 7,229,492 B2 | | 6/2007 | Chatterji et al. |
| 7,297,208 B2 | | 11/2007 | Caveny et al. |
| 7,297,663 B1 | | 11/2007 | Kilchrist et al. |
| 7,331,391 B2 | | 2/2008 | Keese et al. |
| 7,405,182 B2 | | 7/2008 | Verrett |
| 7,493,968 B2 | | 2/2009 | Reddy et al. |
| 7,534,744 B2 | | 5/2009 | Shaarpour |
| 7,612,021 B2 | | 11/2009 | Chatterji et al. |
| 7,741,247 B2 | | 6/2010 | Wang |
| 8,002,049 B2 | | 8/2011 | Keese et al. |
| 8,043,997 B2 | | 10/2011 | Whitfill et al. |
| 2002/0040812 A1 | | 4/2002 | Heying |
| 2004/0023815 A1 | | 2/2004 | Burts, III |
| 2004/0244978 A1 | | 12/2004 | Shaarpour |
| 2006/0079408 A1 | | 4/2006 | Verret |
| 2006/0237192 A1 | * | 10/2006 | Shaarpour ..................... 166/294 |
| 2009/0054269 A1 | * | 2/2009 | Chatterji et al. .............. 507/104 |
| 2009/0221452 A1 | * | 9/2009 | Whitfill et al. ................ 507/104 |
| 2010/0152070 A1 | | 6/2010 | Ghassemzadeh |
| 2010/0193244 A1 | | 8/2010 | Hoskins |
| 2011/0114318 A1 | | 5/2011 | Ezell et al. |
| 2011/0214870 A1 | | 9/2011 | Shaarpour |
| 2011/0278006 A1 | | 11/2011 | Sanders et al. |
| 2012/0108472 A1 | | 5/2012 | Wu |

FOREIGN PATENT DOCUMENTS

| | | | |
|---|---|---|---|
| WO | WO 2010088484 A2 | * | 8/2010 |
| WO | WO 2010-133302 | | 11/2010 |

OTHER PUBLICATIONS

Duo-Squeeze™ H Technical Information.
E Z Squeeze® Technical Information.
Form-A-Blok Technical Information.
Wedge-Set® Technical Information.
"Engineered WellSET™ Treatment Service Helps Prevent Lost Circulation by Strengthening the Wellbore," Halliburton, 2007.
WellLife® 734 Additive Technical Information.
Stoppit™ Product Data Sheet.
Steelseal® Technical Information.
Savari et al., SPE 143603, "Improved Lost Circulation Treatment Design and Testing Techniques Minimize Formation Damage," 2011.
Whitfill et al., SPE 84319, "All Lost-Circulation Materials and Systems Are Not Created Equal," 2003.
International Search Report and Report and Written Opinion for PCT/US2013/028691 prepared by the ISA/US, Jun. 20, 2013. (10 pages).
International Search Report and Report and Written Opinion for PCT/US2013/065904 prepared by the ISA/US, Dec. 26, 2013. (11 pages).

* cited by examiner

*Primary Examiner* — Kaj K Olsen
*Assistant Examiner* — Karam Hijji
(74) *Attorney, Agent, or Firm* — Haynes and Boone, LLP

(57) ABSTRACT

A lost circulation material and method for well treatment employing the material that is effective at sealing or plugging fractured zones and has utility over a wide range of temperatures, including high temperatures. The lost circulation material includes particulate material to quickly de-fluidize the fluid formulation, fibrous material to suspend particles in the slurrified form of the composition and increase the shear strength of the resultant seal, and non-Portland cement material for increasing the compressive strength.

25 Claims, No Drawings

LOST CIRCULATION COMPOSITION FOR FRACTURE SEALING

FIELD OF THE INVENTION

The present embodiments generally relate to subterranean cementing operations and, more particularly, to methods and compositions for preventing or alleviating the loss of drilling fluids and other well servicing fluids into subterranean formations during drilling or construction of boreholes in such subterranean formations.

BACKGROUND

The following paragraphs contain some discussion, which is illuminated by the innovations disclosed in this application, and any discussion of actual or proposed or possible approaches in this Background section does not imply that those approaches are prior art.

Natural resources such as oil and gas residing in a subterranean formation or zone are usually recovered by forming a wellbore that extends into the formation. The wellbore is drilled while circulating a drilling fluid therein. The drilling fluid is usually circulated downwardly through the interior of a drill pipe and upwardly through the annulus, which is located between the exterior of the pipe and the walls of the wellbore. After terminating the circulation of the drilling fluid, a string of pipe, e.g., casing, is run in the wellbore. Next, primary cementing is typically performed by pumping cement slurry into the annulus and allowing the cement to set into a hard mass (i.e., sheath). The cement sheath attaches the string of pipe to the walls of the wellbore and seals the annulus.

Often in drilling a wellbore, one or more permeable zones are encountered. The permeable zones may be, for example, unconsolidated, vugs, voids, naturally occurring fractures, or induced fractures that occur when weak zones have fracture gradients exceeded by the hydrostatic pressure of the drilling fluid or the cement slurry. During the drilling operation, the permeable or thief zones may result in the loss of drilling fluid. The drilling fluid flows into the thief zones rather than being returned to the surface, which reduces circulation of the drilling fluid. When circulation is lost, pressure on the open formation is reduced, which can result in an undesired zone flowing into the well or even catastrophic loss of well control.

A large variety of materials have been used or proposed in attempts to cure lost circulation. Generally, such materials are divided into four types or categories: fibrous materials, such as monofilament synthetic fibers; flaky materials, such as wood chips or mica flakes; granular materials, such as ground marble or petroleum coke; and settable compositions, the relative strength of which increases upon a preplanned mode of triggering after placement, such as hydraulic cement.

Although many materials and compositions exist and have been proposed for preventing lost circulation, there continues to be a need for even more versatile and better compositions and methods for preventing, as well as mitigating, loss of circulation.

SUMMARY OF THE INVENTION

According to certain embodiments of the present invention, an improved lost circulation material (LCM) includes a combination of several materials to obtain a composition that enables the placement of a firm, immobile mass in a fracture, to prevent lost circulation of drilling fluid, which cannot be pressed out of the fracture in part or whole, by pressure fluctuations.

According to certain embodiments of the present invention, the improved lost circulation material for plugging fractures includes particulate material to quickly de-fluidize the fluid formulation, fibrous material to suspend particles in the slurrified form of the composition and increase the shear strength of the resultant seal, and non-Portland cement material for increasing the compressive strength.

The method of the invention uses the lost circulation material composition of the present invention in preventing or alleviating loss of drilling fluid or other fluid circulation in a wellbore penetrating a subterranean formation. According to certain embodiments of the present invention, the lost circulation material composition is provided in a weighted or unweighted "pill" for introduction into the wellbore. Such "pills" typically comprise the lost circulation material composition blended with a required amount of water, base oil, water base drilling fluid or non-aqueous base drilling fluid and in some cases a weighting agent such as barite, salt or calcium carbonate. The amount of the lost circulation material composition used in the pill will depend on the size of the subterranean fracture, opening, or lost circulation zone to be treated. Multiple pills or treatments may be used if needed. According to certain embodiments of the present invention, drilling is stopped while the pill comprising the lost circulation material composition of the present invention is introduced into the wellbore. The lost circulation material composition of the present invention will enter lost circulation zones or porous or fractured portions of the formation where it will prevent or retard the entry of drilling and other wellbore fluids. Pressure can be used to squeeze the pill into the lost circulation zone and de-fluidize the slurry.

DETAILED DESCRIPTION

It is to be understood that the following disclosure provides many different embodiments, or examples, of the present invention for implementing different features of various embodiments of the present invention. Specific examples of components are described below to simplify and exemplify the present disclosure. These are, of course, merely examples and are not intended to be limiting.

According to certain embodiments of the prevent invention, an improved lost circulation material (LCM) includes a combination of several materials to obtain a composition that enables the placement of a firm, immobile mass in a fracture, to prevent lost circulation of drilling fluid, in which the composition cannot be pressed out of the fracture in whole or in part by pressure fluctuations.

The lost circulation material composition is a high-fluid-loss-squeeze material which gains both compressive strength and shear strength when the material is de-fluidized in a fractured zone. For example, the lost circulation material may be used to seal fractured shale formations.

According to certain embodiments of the present invention, the lost circulation material efficiently seals pores and stops drilling fluid losses through large fractures, such as those having a size of about 200 microns or more, and in some embodiments fractures having a size of about 200 microns to about 4000 microns, and in other embodiments fractures having a size of about 500 microns to about 2500 microns, while showing tolerance to high temperatures such as in some embodiments from about 70° F. to about 400° F. and in other embodiments from about 150° F. to about 250° F.

According to certain embodiments of the present invention, the lost circulation material composition for plugging fractures includes particulate material to quickly de-fluidize the fluid formulation, fibrous material to suspend particles in the slurrified form of the composition and increase the shear strength of the resultant seal, and non-Portland cement material for increasing the compressive strength.

According to certain embodiments of the present invention, the particulate material of the lost circulation material composition for plugging fractures includes one or more of diatomaceous earth, graphitic material, and ground cellulosic material. According to certain embodiments, the ground cellulosic material includes one or more of ground nut shells and ground fibrous cellulosic material.

According to certain embodiments of the present invention, the ground nut shells include one or more of walnut shells, peanut shells, almond shells, cashew shells, brazil nut shells, chestnut shells, pistachio shells and pecan shells. According to certain other embodiments, the ground nut shells include one or both of walnut and pecan shells.

According to certain embodiments of the present invention, the fibrous material includes synthetic chopped fibers, such as one or more of polypropylene fibers, viscose fibers, carbon fibers, silicon carbide fibers, fiberglass fibers, acrylic polyester fibers, polyamide fibers, aromatic polyamide fibers, polyolefin fibers, polyurethane fibers, polyvinyl chloride fibers and polyvinyl alcohol fibers, having an average length of about 0.5 to 13 millimeters. In certain other embodiments, the synthetic chopped fibers have an average length of about 1 to 6 millimeters. In still other embodiments, the synthetic chopped fibers have an average length of about 3 millimeters.

According to certain embodiments of the present invention, the non-Portland cement material of the lost circulation material composition for plugging fractures includes a cement set accelerator. According to certain embodiments, the cement set accelerator includes one or more of calcium sulfate hemihydrate and sodium metasilicate. In certain other embodiments, the sodium metasilicate is in anhydrous form.

According to certain embodiments of the present invention, the lost circulation material for plugging fractures includes the following components: about 45-60% by weight of diatomaceous earth, about 5-15% by weight of graphitic material, such as STEELSEAL® which is commercially available from Halliburton Energy Services, Inc., about 5-15% by weight of ground nut shells, about 5-15% by weight of ground fibrous cellulosic material, about 5-15% by weight of synthetic chopped fibers, about 10-20% by weight of calcium sulfate hemihydrate, and about 2-12% by weight of sodium metasilicate.

The diatomaceous earth, the graphitic carbon, the ground nut shells, and the ground fibrous cellulosic material are particulate lost circulation materials and allow quick de-fluidization of the formulations. The synthetic chopped fibers are lost circulation materials that seal the thief zone, that suspend particles in the slurrified form of the formulations and increase the shear strength of the resultant seal. The cement set accelerators are non-Portland cement materials for increasing the compressive strength of the formulations.

The carrier fluid for the lost circulation material may be water, base oil, water base drilling fluid, and non-aqueous base drilling fluid. According to certain embodiments, the lost circulation material is added to the carrier fluid in an amount of up to about 70 pounds per barrel (ppb). Also, according to certain embodiments, a weighted lost circulation material composition can be prepared by adding barite, salt, calcium carbonate or other conventional weighting materials to the fluid to achieve a desired density. A suitable barite weighting material is Baroid® 41 which is commercially available from Halliburton Energy Services, Inc.

In operation, the lost circulation material is mixed with the carrier fluid to form a lost circulation pill and pumped into a wellbore penetrating a subterranean zone. Once the pill has been spotted into the thief zone, squeeze pressure from the surface causes the lost circulation pill to lose fluid quickly to the permeable formation or to the permeable fracture network. The immobile mass that forms gains both compressive and shear strength while in place in a fractured or other permeable zone and plugs the fractured or other permeable zone. The sealing mass quickly sets into a rigid sealing mass that is substantially impermeable to whole drilling fluid such that minimal subsequent drilling or treatment fluids pass into the fractured or other permeable zone.

The following examples are illustrative of the compositions and methods discussed above.

EXAMPLES

Certain embodiments of lost circulation material formulations according to the present invention are shown below in Table 1 and were readily mixed into water or ENCORE® BASE, an olefin-based synthetic base oil which is commercially available from Halliburton Energy Services, Inc. The lost circulation material formulations were prepared by simple mixing of ingredients and are set forth as a percentage by weight of the dry composition.

TABLE 1

High Fluid-Loss Squeeze Formulations

| Material (%) | H-SA-1 | H-SA-2 | H-SA-3 | H-SA-4 |
|---|---|---|---|---|
| STEELSEAL ® 1000 | | 5 | 5 | 5 |
| STEELSEAL ® 400 | 5 | | | |
| Walnut F | 10 | | | |
| Pecan M | | 10 | 10 | 10 |
| BAROFIBRE ® O | 5 | 5 | 5 | 5 |
| Diatomaceous Earth Mn-84 | 54 | 50 | 52 | 50 |
| 3 mm polypropylene fiber | 6 | 10 | 8 | 6 |
| CAL-SEAL 60 ™ | 14 | 14 | 14 | 18 |
| ECONOLITE ™ | 6 | 6 | 6 | 6 |

Walnut F and Pecan M are ground walnut and pecan shells, respectively, which are commercially available from Grinding & Sizing Co., Inc. BAROFIBRE® O is a finely ground fibrous cellulosic material which is commercially available from Halliburton Energy Services, Inc. Diatomaceous Earth Mn-84 is commercially available from EP Minerals. Cal-Seal 60™ is a calcium sulfate hemihydrate cement set accelerator which is commercially available from Halliburton Energy Services, Inc. Econolite™ is a sodium metasilicate cement set accelerator which is commercially available from Halliburton Energy Services, Inc.

As shown in Table 2 below, filter cakes of the lost circulation material formulations set forth in Table 1 above, as well as EZ SQUEEZE® and WEDGE-SET® lost circulation material which are commercially available from Turbo-Chem International Inc. and Sharp-Rock Technologies, Inc., respectively, were prepared under various conditions and then tested in terms of relative shear strength.

TABLE 2

Comparative Relative Shear Strength Analysis

|  | H-SA-1 | H-SA-2 | H-SA-3 | H-SA-4 | EZ-SQUEEZE ® | WEDGE-SET ® |
|---|---|---|---|---|---|---|
| Un-weighted, dewatered at room temp. | 1197 psi | 1810 psi | 1420 psi | 780 psi | 967 psi | 290 psi |
| Un-weighted, dewatered at 200° F. | 1322 psi | 2458 psi | 1898 psi |  | 1035 psi | 263 psi |
| 12.5 lb/gal, dewatered at 200° F. | 590 psi | 760 psi | 740 psi |  | 530 psi | 80 psi |
| Un-weighted, ENCORE at room temp. |  | 1210 psi |  |  | 200 psi |  |
| 12.5 lb/gal, ENCORE at room temp. |  | 230 psi |  |  | 80 psi |  |
| Un-weighted, ENCORE at 200° F. |  | 1650 psi |  |  | 490 psi |  |
| 12.5 lb/gal ENCORE at 200° F. |  | 260 psi |  |  | 160 psi |  |

Relative shear strength was measured using a push-out apparatus. The push-out apparatus measures relative shear strength by applying pressure onto a small portion of a confined composite. Once the composite is formed, it is placed into a close-fitting sample holder, which has a hole at the bottom that is approximately one-half the diameter of the composite. Force is applied via a push-out piece or piston using a Carver Press. The sample holder is raised up, allowing some portion of the composite to be free to come out through the hole. Pressure is linearly applied over time until failure of the composite has been reached which is the yield point. The maximum force in pounds from the gauge is recorded. The recorded pressure is converted to relative shear strength as follows:

Failure area$(A) = \pi * d * t$ $S = (F)/A$

Where d is the plug diameter (in), t is the composite thickness (in), A is the failure area (in$^2$), F is the maximum recorded force (lbf), and S is the relative shear strength (psi).

The height of the filter cakes for each sample and the pounds of force required to push-out a sample of the cake were measured and then used to calculate the relative shear strength. The height of the cake was typically between 10 and 15 mm before the test.

When filter cakes of the lost circulation material compositions of the present invention were made at room temperature, the relative shear strengths varied from 780 to 1810 psi as shown in TABLE 2. These results compare favorably to the results obtained for EZ-SQUEEZE® and WEDGE-SET® and, specifically, the relative shear strength of the H-SA-2 formulation is 1.87 and 6.25 times their relative shear strength, respectively.

The relative shear strength of the H-SA-1, H-SA-2 and H-SA-3 formulations was also determined for filter cakes made at 200° F. and the results are also shown in TABLE 2. Again, the results compare favorably to those obtained for EZ-SQUEEZE® and WEDGE-SET® and, specifically, the relative shear strength of the H-SA-2 formulation is 2.35 and 9.35 times their relative shear strength, respectively.

The relative shear strength of the H-SA-1, H-SA-2 and H-SA-3 formulations at 12.5 lb/gal are also shown in TABLE 2 and again the relative shear strength of the H-SA-2 formulation is 1.4 times higher compared to EZ-SQUEEZE® while the relative shear strength for WEDGE-SET® is less than 100 psi.

The relative shear strengths for H-SA-2 and EZ-SQUEEZE® were determined for un-weighted and 12.5 lb/gal fluid formulations using ENCORE® BASE, an olefin-based synthetic base oil which is commercially available from Halliburton Energy Services, Inc., as the carrier fluid, rather than water. Using ENCORE® BASE as the carrier fluid, un-weighted filter cakes made at room temperature with H-SA-2 have a relative shear strength that is about 6 times higher than those made with EZ-SQUEEZE®. Again using ENCORE® BASE as the carrier fluid, the 12.5 lb/gal filter cakes made at room temperature with H-SA-2 have a relative shear strength that is about 2.9 times higher than those made with EZ-SQUEEZE® as shown in TABLE 2. At 200° F. and using ENCORE® BASE as the carrier fluid, the relative shear strength for H-SA-2 is about 3.33 times higher in the un-weighted fluid and about 1.65 times higher in the 12.5 lb/gal fluid than EZ-SQUEEZE® as shown in TABLE 2.

As shown in TABLE 3 below, filter cakes of certain embodiments of lost circulation material formulations according to the present invention as well as EZ SQUEEZE® and WEDGE-SET® lost circulation materials which are commercially available from Turbo-Chem International Inc. and Sharp-Rock Technologies, Inc., respectively, were prepared under various conditions and then tested in terms of unconfined compressive strength.

TABLE 3

Comparative Unconfined Compressive Strength

|  | H-SA-1 | H-SA-2 | H-SA-3 | EZ-SQUEEZE ® | WEDGE-SET ® |
|---|---|---|---|---|---|
| Un-weighted, dewatered at 200° F. | >950 psi | >950 psi | >950 psi | >950 psi | 600 psi |
| 12.5 lb/gal, dewatered at 200° F. | 160 psi | 910 psi | 340 psi | 230 psi | 170 psi |
| Un-weighted, ENCORE ® at 200° F. |  | >1080 psi |  | >1080 psi |  |
| 12.5 lb/gal, ENCORE ® at 200° F. |  | 520 psi |  | 75 psi |  |

Unconfined compressive strength was measured using a Carver Press where the height of the filter cake was equal to or greater than the diameter of the filter cake. The filter cakes were formed at room temperature and 200° F. using 40 micrometer aloxite (aluminum oxide) disks, as well as slotted disks.

The unconfined compressive strengths for the un-weighted and 12.5 lb/gal fluid formulations containing H-SA-1, H-SA-2 and H-SA-3 were determined at 200° F. The unconfined compressive strengths for the un-weighted formulations were all at least 950 psi for the experimental formulations and EZ-SQUEEZE®, but only 600 psi for WEDGE-SET®. The unconfined compressive strengths for the filter cakes made from 12.5 lb/gal formulations are shown in TABLE 3 and the unconfined compressive strength when using H-SA-2 is about 4 times higher than that for EZ-SQUEEZE®.

The unconfined compressive strength for un-weighted filter cakes of H-SA-2 and EZ-SQUEEZE® using ENCORE® BASE as the carrier fluid, are at least 1080 psi when made at 200° F., but the unconfined compressive strengths drop to 520 psi and 75 psi, respectively when at 12.5 lb/gal. Nevertheless, the unconfined compressive strength at 200° F. when using ENCORE® BASE and H-SA-2 is about 6.9 times higher than when using ENCORE® BASE and EZ-SQUEEZE®.

Slot plugging tests were conducted using 1, 1.5, 2 and 2.5 mm slotted disks as well as a tapered slot (2.5 to 1 mm over 37 mm) to determine if the un-weighted formulation is useful in a range of fracture sizes. All of the un-weighted formulations bridged the slotted disks at a 50 lb/bbl concentration which demonstrates that the formulations are useful in a wide range of lost circulation situations.

Pumpability was measured using a non-positive displacement pump head attachment in place of the emulsion screen on a Silverson Mixer at 3000 rpm for 5 minutes. Two lab barrel quantities of H-SA-1 and H-SA-2 were mixed and then pumped through a 6 mm tube using the Silverson Mixer equipped with a non-positive displacement pump head. Neither of the formulations plugged the tube during the test. When a two barrel mixture of 50 lb/bbl EZ-SQUEEZE® was pumped through the same setup, it plugged the tube within 15 seconds of starting the test.

Fluid loss was measured using a standard API fluid loss apparatus with 100 psi differential at room temperature. Un-weighted fluids containing H-SA-1 or H-SA-2 were dewatered in the API filter press giving >50 ml filtrate over about 15 seconds.

Shown below in TABLE 4 is the formulation for a 12.5 lb/gal BORE-MAX® drilling fluid which was used to determine if the H-SA-2 formulation would still lose fluid quickly after being contaminated with a drilling fluid.

TABLE 4

Formulation for 12.5 lb/gal BORE-MAX

| Material | Amount (g) |
| --- | --- |
| Water | 308.43 |
| BORE-VIS II | 4 |
| BORE-PLUS | 2 |
| POLYAC PLUS | 1 |
| Barite | 197 |
| BARAZAN D PLUS | 0.25 |
| BARABUF | 0.25 |

In terms of the components of BORE-MAX®, BORE-VIS® II is a viscosifier, BORE-PLUS™ is a suspension agent, POLYAC® PLUS is a filtration control agent, BARAZAN® D PLUS is a viscosifier, and BARABUF® is a buffer, all of which are commercially available from Halliburton Energy Services, Inc. Barite is barium sulfate and is widely commercially available.

When an un-weighted fluid formulation of H-SA-2 was contaminated by a 10% addition of 12.5 lb/gal BORE-MAX®, the filtration rate decreased from >50 ml in 30 seconds to 31 ml in 30 seconds. Reducing the amount of contamination to 5% resulted in a filtration rate of 42 ml in 30 seconds. When the un-weighted fluid was contaminated with 4% BORE-MAX®, the filtration rate was 50 ml in 22 seconds. The 12.5 lb/gal fluid formulation containing H-SA-2 tolerated the 10% addition of BORE-MAX® and had a filtration rate of 50 ml in 20 seconds. A filter cake containing un-weighted H-SA-2 and 10% BORE-MAX® was measured to have a relative shear strength of 1850 psi, after it was dewatered at 200° F. A filter-cake containing 12.5 lb/gal H-SA-2 and 10% BORE-MAX® was measured to have a relative shear strength of 740 psi, after it was dewatered at 200° F.

While the present invention has been described in terms of certain embodiments, those skilled in the art will recognize that the invention can be practiced with modification within the spirit and scope of the appended claims.

The present disclosure has been described relative to certain embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A lost circulation material composition, comprising:
   particulate material, wherein the particulate material comprises 45 to 60 percent by weight of the composition of diatomaceous earth, 5 to 15 percent by weight of the composition of graphitic material, 5 to 15 percent by weight of the composition of ground nut shells and 5 to 15 percent by weight of the composition of ground fibrous cellulosic material;
   fibrous material, wherein the fibrous material comprises 5 to 15 percent by weight of the composition of synthetic chopped fibers; and
   non-Portland cement material, wherein the non-Portland cement material comprises 10 to 20 percent by weight of the composition of calcium sulfate hemihydrate and 2 to 12 weight percent of the composition of sodium meta-silicate.

2. The lost circulation material composition of claim 1, wherein the ground nut shells are selected from the group consisting of walnut shells, peanut shells, almond shells, cashew shells, brazil nut shells, chestnut shells, pistachio shells and pecan shells.

3. The lost circulation material composition of claim 1, wherein the ground nut shells are selected from the group consisting of walnut shells and pecan shells.

4. The lost circulation material composition of claim 1, wherein the synthetic chopped fibers are selected from the group consisting of polypropylene fibers, viscose fibers, carbon fibers, silicon carbide fibers, fiberglass fibers, acrylic polyester fibers, polyamide fibers, aromatic polyamide fibers, polyolefin fibers, polyurethane fibers, polyvinyl chloride fibers and polyvinyl alcohol fibers.

5. The lost circulation material composition of claim 1, wherein the synthetic chopped fibers are selected from the group consisting of polypropylene fibers, viscose fibers and carbon fibers.

6. The lost circulation material composition of claim 4, wherein the synthetic chopped fibers have an average length of from about 0.5 to 13 millimeters.

7. The lost circulation material composition of claim 4, wherein the synthetic chopped fibers have an average length of from about 1 to 6 millimeters.

8. The lost circulation material composition of claim 4, wherein the synthetic chopped fibers have an average length of about 3 millimeters.

9. The lost circulation material composition of claim 1, wherein the non-Portland cement material comprises a cement set accelerator.

10. The lost circulation material composition of claim 1, wherein the lost circulation material forms an unweighted filter cake having a relative shear strength of from 780 psi to 1810 psi at room temperature.

11. The lost circulation material composition of claim 1, wherein the lost circulation material forms an unweighted filter cake having an unconfined compressive strength of greater than 950 psi at 200° F.

12. A method of sealing a fracture within a subterranean formation, comprising:
preparing a lost circulation material composition comprising:
particulate material, wherein the particulate material comprises 45 to 60 percent by weight of the composition of diatomaceous earth, 5 to 15 percent by weight of the composition of graphitic material, 5 to 15 percent by weight of the composition of ground nut shells and 5 to 15 percent by weight of the composition of ground fibrous cellulosic material;
fibrous material, wherein the fibrous material comprises 5 to 15 percent by weight of the composition of synthetic chopped fibers; and
non-Portland cement material, wherein the non-Portland cement material comprises 10 to 20 percent by weight of the composition of calcium sulfate hemihydrate and 2 to 12 weight percent of the composition of sodium metasilicate;
mixing the lost circulation material composition with a carrier fluid; and
contacting the lost circulation material composition with the subterranean formation such that the lost circulation material composition forms a sealing mass, thereby substantially sealing a fracture within the subterranean formation.

13. The method of claim 12, wherein the lost circulation material composition seals fractures having a size of at least 200 microns.

14. The method of claim 12, wherein the lost circulation material composition seals fractures having a size of from 200 microns to 4000 microns.

15. The method of claim 12, wherein the lost circulation material composition seals fractures having a size of from 500 microns to 2500 microns.

16. The method of claim 12, wherein the lost circulation material composition seals fractures when it is subjected to a temperature of from 70° F. to 400° F.

17. The method of claim 12, wherein the lost circulation material composition seals fractures when it is subjected to a temperature of from 150° F. to 250° F.

18. The method of claim 11, wherein the carrier fluid is selected from the group consisting of water, base oil, water base drilling fluid and non-aqueous base drilling fluid.

19. The method of claim 12, wherein the lost circulation material is added to the carrier fluid in an amount of up to about 70 pounds per barrel.

20. The method of claim 12, wherein the lost circulation material forms an unweighted filter cake having a relative shear strength of from 780 psi to 1810 psi at room temperature.

21. The method of claim 12, wherein the lost circulation material forms an unweighted filter cake having a relative shear strength of from 1322 psi to 2458 psi at 200° F.

22. The method of claim 12, wherein the lost circulation material forms an unweighted filter cake having an unconfined compressive strength of greater than 950 psi at 200° F.

23. The method of claim 12, wherein a weighting material is added to the mixture of the lost circulation material composition and the carrier fluid, the weighting material being selected from the group consisting of barite, salt and calcium carbonate.

24. The method of claim 23, wherein the lost circulation material forms a weighted filter cake having a relative shear strength of from 590 psi to 760 psi at 200° F.

25. The method of claim 23 wherein the lost circulation material forms a weighted filter cake having an unconfined compressive strength of from 160 psi to 910 psi at 200° F.

* * * * *